(12) United States Patent
Hanamura et al.

(10) Patent No.: US 10,648,410 B2
(45) Date of Patent: May 12, 2020

(54) PISTON TEMPERATURE STATE MONITORING SYSTEM FOR INTERNAL COMBUSTION ENGINE AND PISTON TEMPERATURE MONITORING METHOD FOR INTERNAL COMBUSTION ENGINE

(71) Applicant: ISUZU MOTORS LIMITED, Shinagawa-ku, Tokyo (JP)

(72) Inventors: Yoshifumi Hanamura, Yokohama (JP); Takuro Mita, Fujisawa (JP); Nobuo Aoki, Fujisawa (JP); Toshiaki Adachi, Machida (JP); Tamotsu Anagama, Yamato (JP); Satoshi Uehara, Chigasaki (JP); Noriyuki Tsukamoto, Ryugasaki (JP); Yorimasa Tsubota, Yokohama (JP)

(73) Assignee: ISUZU MOTORS LIMITED, Shinagawa-Ku, Tokyo (JP)

(*) Notice: Subject to any disclaimer, the term of this patent is extended or adjusted under 35 U.S.C. 154(b) by 0 days.

(21) Appl. No.: 16/334,960

(22) PCT Filed: Sep. 21, 2017

(86) PCT No.: PCT/JP2017/034086
§ 371 (c)(1),
(2) Date: Mar. 20, 2019

(87) PCT Pub. No.: WO2018/056354
PCT Pub. Date: Mar. 29, 2018

(65) Prior Publication Data
US 2020/0025116 A1 Jan. 23, 2020

(30) Foreign Application Priority Data
Sep. 21, 2016 (JP) ................. 2016-184530

(51) Int. Cl.
*F02D 35/02* (2006.01)
*F02D 41/04* (2006.01)
(Continued)

(52) U.S. Cl.
CPC .......... *F02D 35/026* (2013.01); *F02D 41/04* (2013.01); *F02D 41/22* (2013.01); *F02D 41/401* (2013.01); *F02D 43/00* (2013.01); *F02D 45/00* (2013.01)

(58) Field of Classification Search
CPC ........ F02D 35/026; F02D 41/04; F02D 41/22; F02D 41/401; F02D 43/00; F02D 45/00
(Continued)

(56) References Cited

U.S. PATENT DOCUMENTS 7,900,601 B2 * 3/2011 Gwidt ................. F02D 41/401
123/299
9,816,454 B1 * 11/2017 Anderson ............. F02D 35/026
(Continued)

FOREIGN PATENT DOCUMENTS

EP 1898079 A1 3/2008
FR 2942270 A1 8/2010
(Continued)

OTHER PUBLICATIONS

Extended European Search Report for Related EP App No. 17853123.2 dated Sep. 11, 2019, 9 pgs.
(Continued)

*Primary Examiner* — Mahmoud Gimie
(74) *Attorney, Agent, or Firm* — Procopio, Cory, Hargreaves & Savitch LLP

(57) ABSTRACT

Provided is a piston temperature state monitoring system for an internal combustion engine and a piston temperature monitoring method for an internal combustion engine which are capable of properly managing a history of a piston
(Continued)

temperature. When the number of times of a piston temperature suppression control is counted, if a ratio of a temperature difference which is the difference between a maximum limit temperature and a piston temperature to a margin width which is the difference between the maximum limit temperature and a control start temperature is equal to or less than a count threshold ratio set in advance or calculated, a count output system outputs a count signal.

5 Claims, 3 Drawing Sheets

(51) Int. Cl.
*F02D 41/22* (2006.01)
*F02D 41/40* (2006.01)
F02D 43/00 (2006.01)
F02D 45/00 (2006.01)

(58) Field of Classification Search
USPC .......................................................... 123/435
See application file for complete search history.

(56) References Cited

U.S. PATENT DOCUMENTS

| | | | |
|---|---|---|---|
| 2014/0074381 A1* | 3/2014 | Sczomak | ................ F02D 41/14 701/105 |
| 2014/0088852 A1* | 3/2014 | Yaguchi | ................ F02D 35/023 701/103 |
| 2017/0284897 A1 | 10/2017 | Roe et al. | |

FOREIGN PATENT DOCUMENTS

| | | |
|---|---|---|
| JP | H06-010749 A | 1/1994 |
| JP | 2009-103106 A | 5/2009 |
| JP | 2011-153535 A | 8/2011 |
| JP | 2013-029040 A | 2/2013 |
| JP | 2016-102471 A | 6/2016 |
| JP | 2018059463 A | 4/2018 |
| JP | 2018059464 A | 4/2018 |

OTHER PUBLICATIONS

International Search Report and Written Opinion for related International Application No. PCT/JP2017/034086 dated Oct. 31, 2017; English translation of ISR provided; 8 pages.

* cited by examiner

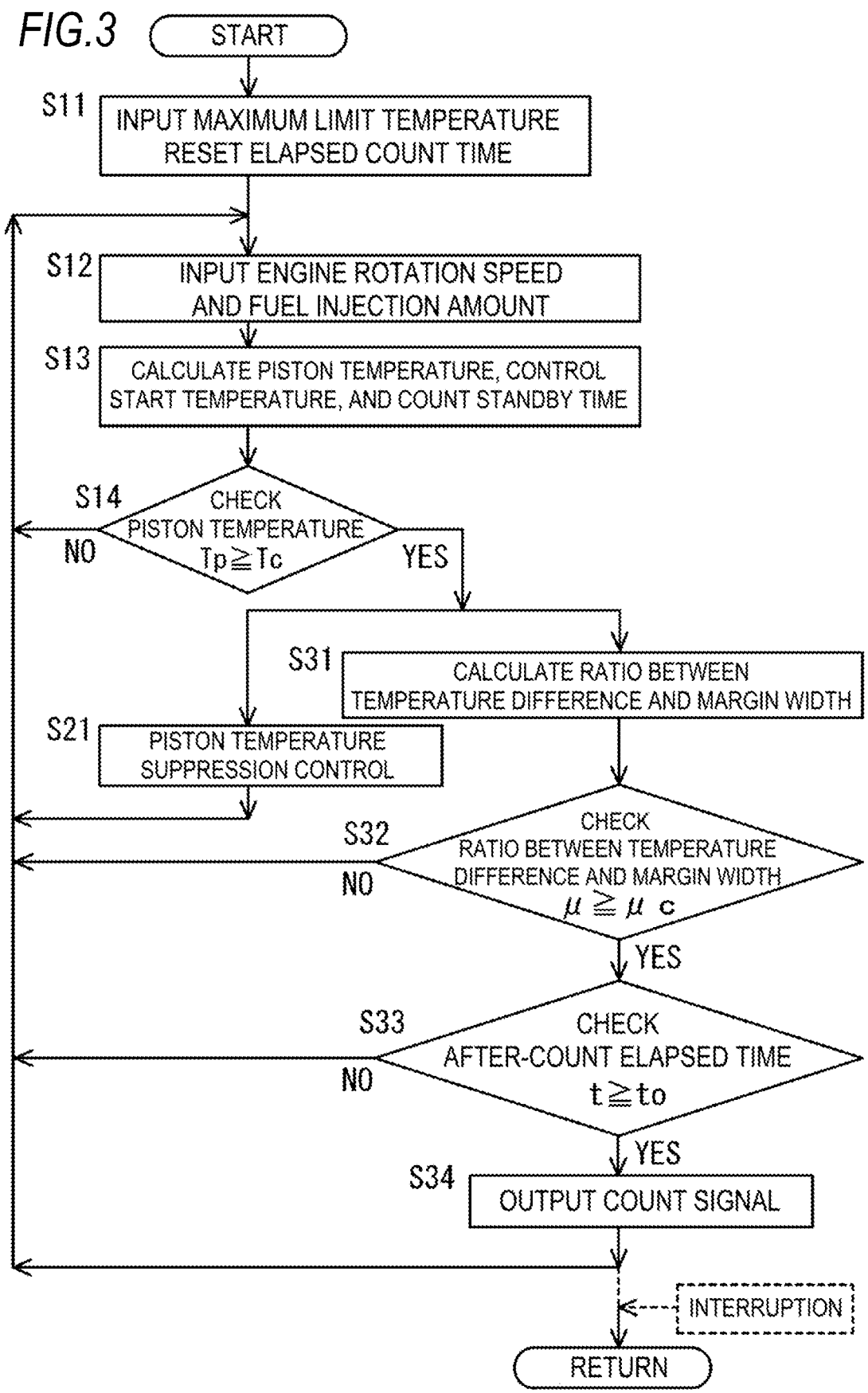

PISTON TEMPERATURE STATE MONITORING SYSTEM FOR INTERNAL COMBUSTION ENGINE AND PISTON TEMPERATURE MONITORING METHOD FOR INTERNAL COMBUSTION ENGINE

CROSS-REFERENCE TO RELATED APPLICATIONS

This application is a U.S. National Stage entry of PCT Application No: PCT/JP2017/034086 filed on Sep. 21, 2017, which claims priority to Japanese Patent Application No. 2016-184530, filed Sep. 21, 2016, the contents of which are incorporated herein by reference.

TECHNICAL FIELD

The present disclosure relates to a piston temperature state monitoring system for an internal combustion engine and a piston temperature monitoring method for an internal combustion engine which are capable of appropriately grasping frequency at which a piston of the internal combustion engine becomes hot.

BACKGROUND ART

In an internal combustion engine such as a diesel engine equipped in a vehicle, a piston is reciprocated by burning fuel to obtain a rotational force. The piston is repeatedly exposed to high-temperature combustion gas, and thus a large thermal load is repeatedly applied to the piston. Therefore, it is necessary to pay attention to excessive temperature rise of the piston which exerts a huge influence on the durability of the piston, so a fuel injection timing is changed so that the piston temperature does not rise too much.

For example, a control system of an internal combustion engine has been proposed in which an in-cylinder direct injection spark ignition internal combustion engine sets the fuel injection timing by an injector near an intake bottom dead center when a piston temperature is equal to or lower than a temperature threshold value and sets the fuel injection timing by the injector near an intake top dead center when the piston temperature is higher than the temperature threshold value (see Patent Literature 1, for example).

CITATION LIST

Patent Literature

[Patent Literature 1]: Japanese Unexamined Patent Application Publication No. 2009-103106

SUMMARY

Technical Problem

Meanwhile, since a piston is repeatedly exposed to high temperatures during operation of an internal combustion engine, in a case where degradation in the durability of the piston is estimated, in addition to avoiding excessive temperature rise of the piston temperature, proper management of a history of the piston temperature as to what degree a state reaches a high temperature state where the piston is thermally damaged is required.

The present disclosure provides a piston temperature state monitoring system for an internal combustion engine and a piston temperature monitoring method for an internal combustion engine which are capable of properly managing a history of a piston temperature as to what degree a state reaches a high temperature state where a piston is thermally damaged during operation of the internal combustion engine.

Solution to Problem

According to the present disclosure, there is provided a piston temperature state monitoring system for an internal combustion engine which monitors a frequency at which a temperature of a piston of the internal combustion engine becomes equal to or higher than a monitoring setting temperature set in advance or calculated and includes piston temperature calculation system, a piston temperature suppression control system, and a count output system, in which the piston temperature calculation system measures or estimates a piston temperature, the piston temperature suppression control system receives the piston temperature and, when the piston temperature is equal to or higher than a control start temperature, the piston temperature suppression control system performs a piston temperature suppression control where fuel injection into a cylinder is controlled to suppress an increase in the piston temperature based on a maximum limit temperature in which the piston temperature is set in advance and the control start temperature which is the value lower than the maximum limit temperature and set in advance or calculated every moment, and, when the number of times of the piston temperature suppression control is counted, if a ratio of a temperature difference which is the difference between the maximum limit temperature and the piston temperature to a margin width which is the difference between the maximum limit temperature and the control start temperature is equal to or less than a count threshold ratio set in advance or calculated, the count output system outputs the count signal.

According to the present disclosure, there is provided a piston temperature state monitoring method for an internal combustion engine which monitors a frequency at which a temperature of a piston of the internal combustion engine becomes equal to or higher than a monitoring setting temperature set in advance or calculated and includes measuring or estimating a piston temperature by a piston temperature calculation system, inputting the piston temperature to a piston temperature suppression control system and performing a piston temperature suppression control by the piston temperature suppression control system where, when the piston temperature is equal to or higher than the control start temperature, fuel injection into a cylinder is controlled to suppress an increase in the piston temperature based on a maximum limit temperature in which the piston temperature is set in advance and the control start temperature which is the value lower than the maximum limit temperature and set in advance or calculated every moment, and outputting a count signal from a count output system when the number of times of the piston temperature suppression control is counted, if a ratio of a temperature difference which is the difference between the maximum limit temperature and the piston temperature to a margin width which is the difference between the maximum limit temperature and the control start temperature is equal to or less than a count threshold ratio set in advance or calculated.

Advantageous Effects of the Invention

According to a piston temperature state monitoring system and a piston temperature monitoring method for an internal combustion engine of the present disclosure, it is possible to properly manage a history of a piston temperature as to what degree a state reaches a high temperature state where a piston is thermally damaged during operation of the internal combustion engine.

BRIEF DESCRIPTION OF THE DRAWINGS

FIG. 3 is a diagram illustrating an example of a control flow of a piston temperature state monitoring method for an internal combustion engine.

DESCRIPTION OF EMBODIMENTS

Hereinafter, a piston temperature state monitoring system for an internal combustion engine and a piston temperature monitoring method for an internal combustion engine according to an embodiment of the present disclosure will be described with reference to the drawings.

Figure 1:
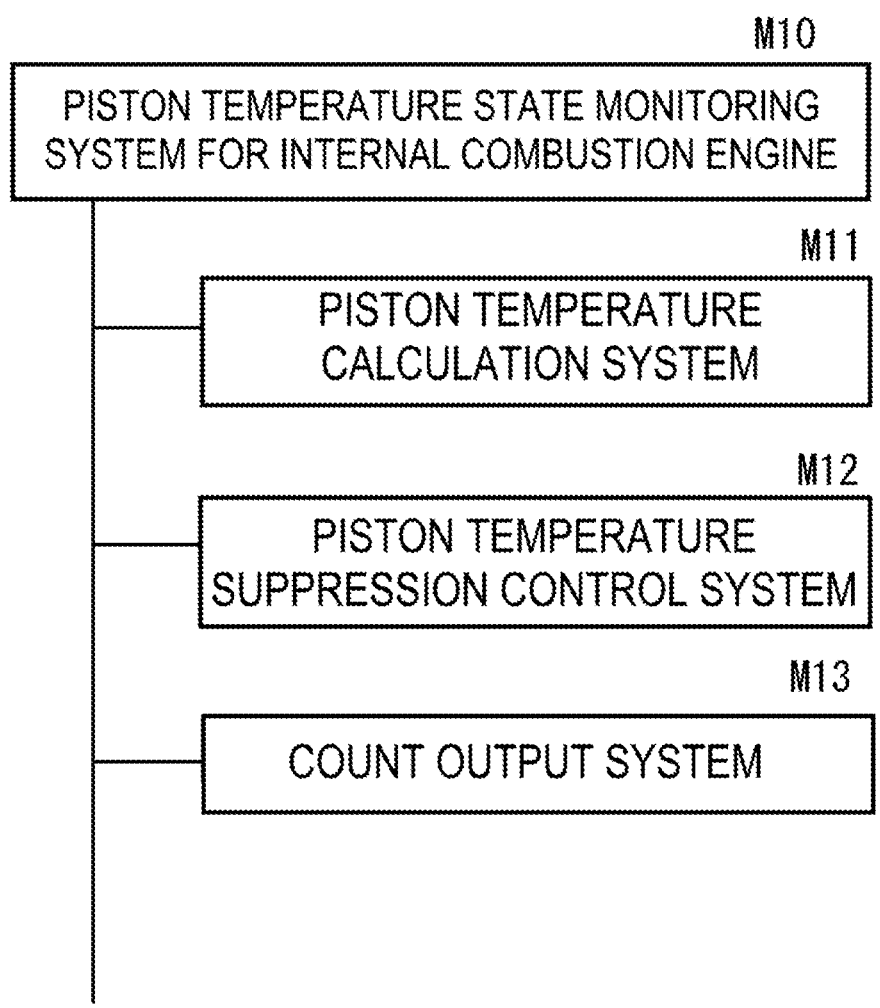
FIG. 1 is a diagram illustrating a configuration of a piston temperature state monitoring system for an internal combustion engine.
Figure 2:
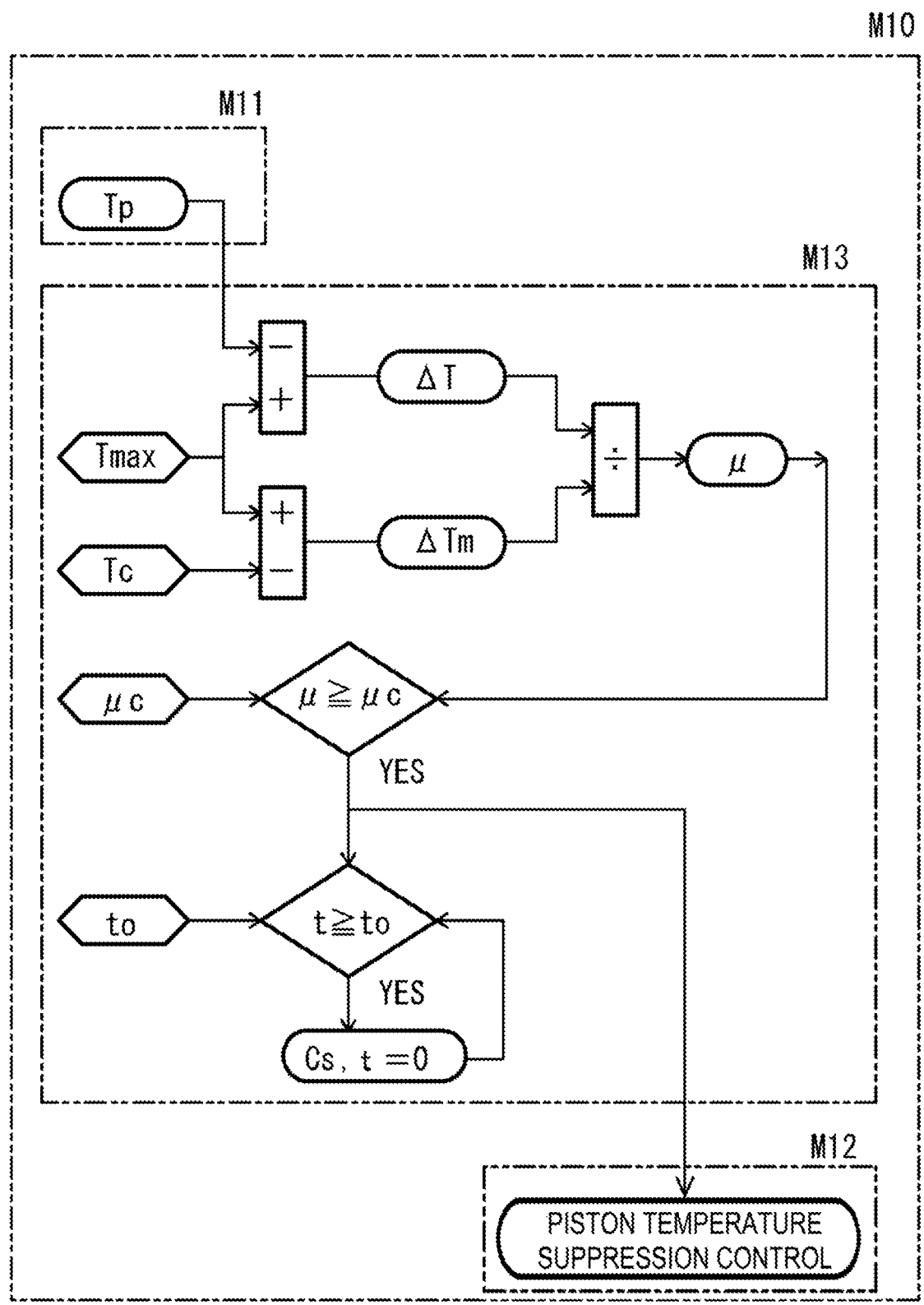
FIG. 2 is a diagram illustrating calculation in the piston temperature state monitoring system for the internal combustion engine.

The piston temperature state monitoring system for the internal combustion engine of the present disclosure is a system which monitors frequency at which a temperature of a piston of the internal combustion engine becomes equal to or higher than a monitoring setting temperature which is set in advance or calculated. As illustrated in FIGS. 1 and 2, a piston temperature state monitoring system for an internal combustion engine M10 includes a piston temperature calculation system M11, a piston temperature suppression control system M12, and a count output system M13.

The piston temperature calculation system M11 is a system which measures or estimates a piston temperature Tp. The piston temperature Tp may be obtained by directly measuring a temperature of a piston, estimating the temperature based on an engine rotation speed and a fuel injection amount with reference to a map data set in advance, or estimating the temperature based on another experiment statistical model. Here, it is sufficient to obtain the piston temperature Tp by applying well-known techniques.

As illustrated in FIG. 2, the piston temperature suppression control system M12 receives the piston temperature Tp calculated by the piston temperature calculation system M11 and, when the piston temperature Tp is equal to or higher than a control start temperature Tc, the piston temperature suppression control system M12 performs the piston temperature suppression control where the fuel injection into a cylinder, in particular, the fuel injection timing is controlled to suppress an increase in the piston temperature Tp based on a maximum limit temperature Tmax in which the piston temperature Tp is set in advance and the control start temperature Tc which is a value lower than the maximum limit temperature Tmax and set in advance or calculated every moment.

The maximum limit temperature Tmax is a value set in advance by experiments or the like. As for the control start temperature Tc, values set in advance by experiments or the like may be adopted. However, the control start temperature Tc may be set to a temperature which is lower than the maximum limit temperature Tmax by a predetermined temperature $\Delta Ts$ set in advance or may be set to a value calculated every moment depending on the engine rotation speed, the fuel injection amount, and the like. That is, the temperature may be a value which is affected by the engine rotation speed and the fuel injection amount. For example, the temperature may be calculated with reference to map data or the like set in advance through experiments or the like with respect to the engine rotation speed and the fuel injection amount representing an operating state of the engine.

The piston temperature suppression control mainly controls the fuel injection timing by the piston temperature suppression control system M12. That is, as the temperature of the piston increases, there is a possibility that the amount of heat generated by the combustion reaction in a cylinder excessively increases the temperature of the piston and the amount of deterioration in the durability of the piston increases. Therefore, when the piston temperature Tp is high, an injection start timing control value Sc of a fuel is delayed from a normal standard injection start timing Sn and thus the combustion state in the cylinder is changed so as to lower the combustion temperature in the cylinder, thereby excessive temperature rise of the piston is suppressed.

An example of the piston temperature suppression control will be described below. When the piston temperature Tp is, for example, equal to or lower than the control start temperature Tc, the injection start timing control value Sc is set to the standard injection start timing Sn and, when the piston temperature Tp is equal to or higher than the maximum limit temperature Tmax, the injection start timing control value Sc is set to a maximum delay injection start timing Smax. Further, when the piston temperature Tp is higher than the control start temperature Tc and lower than the maximum limit temperature Tmax, the injection start timing control value Sc is set to an injection start timing Sk obtained by linear approximation between the maximum delay injection start timing Smax and the standard injection start timing Sn. For the piston temperature suppression control, it is sufficient to suppress excessive temperature rise of the piston temperature Tp by applying well-known techniques.

The count output system which is an important portion of the present disclosure is configured such that, when the number of times executing the piston temperature suppression control is counted, if a ratio ($\mu = \Delta T / \Delta Tm$) of a temperature difference $\Delta T$ ($=Tmax-Tp$) which is the difference between the maximum limit temperature Tmax and the piston temperature Tp to a margin width $\Delta Tm$ ($=Tamax-Tc$) which is the difference between the maximum limit temperature Tmax and the control start temperature Tc is equal to or less than a count threshold ratio $\mu c$ which is set in advance or calculated, a count signal Cs is output.

That is, when the piston temperature Tp is equal to or lower than the control start temperature Tc, "$\mu \geq 1$" is satisfied and, when the piston temperature Tp is higher than the control start temperature Tc and lower than the maximum limit temperature Tmax, "$1 > \mu > 0$" is satisfied, and further, when the piston temperature Tp is equal to or higher than the maximum limit temperature Tmax, "$0 \geq \mu$" is satisfied.

The count threshold ratio $\mu c$ is set to a value which is greater than 0.0 and less than 1.0, for example, a value within the range of 0.3 to 0.7, and more preferably a value within the range of 0.4 to 0.6. However, it is preferable to set, by experiment or the like, the count threshold ratio $\mu c$ to an optimum value at which the count signal Cs can be transmitted at a timing when the piston temperature suppression control is reliably performed.

When the count threshold ratio $\mu c$ is set to "1", it becomes a count at the timing when the piston temperature suppression control is started. Therefore, even when the damage is relatively small such that the piston temperature Tp immediately becomes lower than the control start temperature Tc due to an effect of the piston temperature suppression control, the count signal Cs is output.

Further, when the count threshold ratio μc is set to "0", it becomes a count at the timing when the piston temperature Tp reaches the maximum limit temperature Tmax. Therefore, even when the piston temperature suppression control is started, if the piston temperature Tp becomes lower than the maximum limit temperature Tmax due to the effect of the piston temperature suppression control and the piston temperature Tp does not become equal to or higher than the maximum limit temperature Tmax, the count signal Cs is not output. As a result, even when the damage is relatively large, the count signal Cs is not output.

On the contrary, by using an appropriate count threshold ratio μc, for example, "μc=0.5", it becomes a count while the piston temperature suppression control is being executed. Therefore, the count signal Cs is output only when the piston temperature Tp reaches a relatively large temperature range and the piston is damaged, and thus it is possible to appropriately transmit the signal with the frequency of the high temperature condition where the piston is damaged.

The count output system M13 is configured such that, even if the value of the ratio μ is equal to or less than the count threshold ratio μc after the count signal Cs is output, when the count signal Cs is output, a subsequent count signal Cs is not output until a count standby period to set in advance or calculated has elapsed. The count standby period to is set to a constant value in advance by experiments or the like. The count standby period to is set to, for example, about 200 seconds or longer and 400 seconds or shorter, and preferably about 250 seconds or longer and 350 seconds or shorter. However, the count standby period to may be changed according to the engine rotation speed and the fuel injection amount. For example, since the piston temperature tends to be high when the operating condition of the engine is in a high load state, the count standby period to is relatively shortened. On the contrary, since the piston temperature is difficult to rise when the operating condition of the engine is in a low load state, the count standby period to is relatively lengthened.

In this case, the control period of the piston temperature suppression control varies depending on the operating condition of the engine. Thus, a more appropriate count standby period to can be obtained by setting the count standby time to based on the engine rotation speed and the fuel injection amount which indicate the engine operating condition.

By adopting this configuration, once the count signal Cs is sent, count signal Cs is not sent during the count standby period to, so it is possible to prevent the signal from being transmitted many times consecutively. This makes it possible to transmit the count signal Cs, which is a notification that the piston temperature suppression control has been performed, at a more appropriate frequency. In other words, when the count signal Cs is continuously output, the damage will be unknown, so it is decided to watch it discretely and the entry and exit of the piston temperature suppression control is counted as one.

Further, when the count output system M13 outputs the count signal Cs, it is preferable that the count output system M13 adds the engine rotation speed and the fuel injection amount, furthermore, the environment data (air temperature, vehicle speed, cooling water temperature, and the like) and the like at the time of travelling of a vehicle equipped with the internal combustion engine to the count signal Cs and outputs the signal. As a result, it becomes possible for a designer or an engineer to grasp in more detail the fact that the piston is in a high temperature state where the piston is thermally damaged during operation of the internal combustion engine and the piston temperature suppression control is performed under what circumstances. Based on this information, it will be possible to find the cause of malfunction related to the piston of the internal combustion engine and the cause of the failure in the market.

As a receiver of the count signal Cs, a system for monitoring the entirety of the interior of a vehicle, that is, an information processing system or an integrated data accumulation system for data-accumulating the information from a controller such as an engine control unit (ECU), and a report to an information data center outside the vehicle can be considered.

Next, a piston temperature state monitoring method for an internal combustion engine according to the embodiment of the present disclosure will be described. The piston temperature state monitoring method for the internal combustion engine is a piston temperature state monitoring method for an internal combustion engine which monitors the frequency at which the temperature of the piston of the internal combustion engine becomes equal to or higher than the monitoring setting temperature set in advance or calculated.

The piston temperature state monitoring method for the internal combustion engine is performed by a control flow as illustrated in FIG. 3. The control flow in FIG. 3 is illustrated as a control flow where, when the internal combustion engine starts operation, the control flow is called from an advanced control flow and executed, and when the internal combustion engine stops operation, the control is stopped by interruption and the control flow returns to the advanced control flow, and then the control flow is finished with the advanced control flow.

When the control flow in FIG. 3 starts, in Step S11, the maximum limit temperature Tmax and the like are input, and at the same time, a after-count elapsed time t is reset to zero. This after-count elapsed time t continues counting during the control of the control flow and continues counting after being reset in Step S34. In the next Step S12, the engine rotation speed and the fuel injection amount indicating the engine operating condition are input. Then, in the next Step S13, the piston temperature Tp, the control start temperature Tc, and the count standby period to are calculated.

In the next Step S14, it is determined whether the piston temperature Tp is equal to or higher than the control start temperature Tc. When the piston temperature Tp is not equal to or higher than the control start temperature Tc in the determination in Step S14, the process proceeds to NO and the process returns to Step S12. In addition, when the piston temperature Tp is equal to or higher than the control start temperature Tc in the determination in Step S14, the process proceeds to YES and the process proceeds to Step S21 and Step S31. In this Step S21, the piston temperature suppression control is performed and, when the piston temperature suppression control is finished, the process returns to Step S12.

In Step S31 branching at Step S14, the ratio μ, which is the ratio of the temperature difference ΔT which is the difference between the maximum limit temperature Tmax and the piston temperature Tp to the margin width ΔTm which is the difference between the maximum limit temperature Tmax and the control start temperature Tc, is calculated, in parallel with Step S21.

In the next Step S32, it is determined whether the ratio μ is equal to or less than the count threshold ratio μc. When it is determined in Step S32 that the ratio μ is not equal to or less than the count threshold ratio μc, the process proceeds to NO and the process returns to Step S12. When it is determined in Step S32 that the ratio μ is equal to or less than the count threshold ratio μc, the process proceeds to YES and the process proceeds to Step S33.

In Step S33, it is determined whether the after-count elapsed time t is equal to or longer than the count standby time to. When the after-count elapsed time t is not equal to or longer than the count standby time to in the determination in Step S33, the process proceeds to NO and the process returns to Step S12. When the after-count elapsed time t is equal to or longer than the count standby time to in the determination in Step S33, the process proceeds to YES and the process proceeds to Step S34. In Step S34, the count signal Cs is output. Along with that, the after-count elapsed time t is reset to zero. Then, the process returns to Step S12. As a result, even when the ratio μ is greater than the count threshold ratio μc or the ratio μ is equal to or less than the count threshold ratio μc, the count signal Cs is not output if the count standby time to has not elapsed from the previous output of the count signal Cs.

Therefore, the process is repeatedly executed while selecting each path from Step S12 and the piston temperature suppression control and the output of the count signal Cs are performed as necessary. When the internal combustion engine stops operation, the control is stopped by interruption and the flow returns to the advanced control flow, and then the flow is finished with the advanced control flow.

Therefore, the following method can be implemented. That is, in the piston temperature state monitoring method for the internal combustion engine, the piston temperature Tp is measured or estimated with the piston temperature calculation system M11. Next, the piston temperature suppression control system M12 receives the piston temperature Tp and, when the piston temperature Tp is equal to or higher than a control start temperature Tc, the piston temperature suppression control system M12 performs the piston temperature suppression control where the fuel injection into the cylinder is controlled to suppress an increase in the piston temperature based on the maximum limit temperature Tmax in which the piston temperature Tp is set in advance and the control start temperature Tc which is the value lower than the maximum limit temperature Tmax and set in advance or calculated every moment. Also, when the number of times of the piston temperature suppression control is counted, if the ratio μ of the temperature difference ΔT which is the difference between the maximum limit temperature Tmax and the piston temperature Tp to the margin width ΔTm which is the difference between the maximum limit temperature Tmax and the control start temperature Tc is equal to or less than the count threshold ratio μc set in advance or calculated, the count output system M13 outputs the count signal Cs.

Therefore, according to the piston temperature state monitoring system and the piston temperature monitoring method for the internal combustion engine of the embodiment described above, the count signal Cs can be properly transmitted in a high temperature state which causes damages. As a result, it is possible to properly manage a history of the piston temperature as to what degree a state reaches a high temperature state where the piston is thermally damaged during operation of the internal combustion engine.

Furthermore, it becomes possible for a designer or an engineer to grasp the fact that the piston temperature suppression control is performed under what circumstances and, based on such information, it becomes possible to find the cause of malfunction related to the piston of and the cause of the failure in the market.

This application is based on Japanese patent application No. 2016-184530 filed on Sep. 21, 2016, the contents of which are incorporated herein by reference.

INDUSTRIAL APPLICABILITY

According to the present disclosure, it is possible to properly manage a history of a piston temperature as to what degree a state reaches a high temperature state where a piston is thermally damaged during operation of an internal combustion engine.

REFERENCE SIGNS LIST

Cs: count signal
M10: piston temperature state monitoring system for internal combustion engine
M11: piston temperature calculation system
M12: piston temperature suppression control system
M13: count output system
Tc: control start temperature
Tp: piston temperature
Tmax: maximum limit temperature
t: elapsed time after output of count signal
to: count standby time
μ: ratio
μc: count threshold ratio
ΔT: temperature difference
ΔTm: margin width

The invention claimed is:
1. A piston temperature state monitoring system for an internal combustion engine which monitors a frequency at which a temperature of a piston of the internal combustion engine becomes equal to or higher than a monitoring setting temperature set in advance or calculated, comprising:
   a piston temperature calculation system;
   a piston temperature suppression control system; and
   a count output system, wherein
   the piston temperature calculation system measures or estimates a piston temperature,
   the piston temperature suppression control system receives the piston temperature and, when the piston temperature is equal to or higher than a control start temperature, the piston temperature suppression control system performs a piston temperature suppression control where fuel injection into a cylinder is controlled to suppress an increase in the piston temperature based on a maximum limit temperature, in which the piston temperature is set in advance, and the control start temperature, which is the value lower than the maximum limit temperature and set in advance or calculated every moment, and
   when the number of times of the piston temperature suppression control is counted, if a ratio of a temperature difference which is the difference between the maximum limit temperature and the piston temperature to a margin width which is the difference between the maximum limit temperature and the control start temperature is equal to or less than a count threshold ratio set in advance or calculated, the count output system outputs the count signal.
2. The piston temperature state monitoring system according to claim 1, wherein when the count output system outputs the count signal, after the count signal is output, a subsequent count signal is not output until a count standby period set in advance or calculated elapses.

3. The piston temperature state monitoring system according to claim 2, wherein
the count output system sets the count standby period based on an engine rotation speed and a fuel injection amount.

4. The piston temperature state monitoring system according to claim 1, wherein
the count output system outputs the count signal with adding the engine rotation speed and the fuel injection amount to a time series of counting when the count output system outputs count signal.

5. A piston temperature state monitoring method for an internal combustion engine which monitors a frequency at which a temperature of a piston of the internal combustion engine becomes equal to or higher than a monitoring setting temperature set in advance or calculated, comprising:
measuring or estimating a piston temperature by a piston temperature calculation system;
inputting the piston temperature to a piston temperature suppression control system and performing a piston temperature suppression control by the piston temperature suppression control system where, when the piston temperature is equal to or higher than the control start temperature, fuel injection into a cylinder is controlled to suppress an increase in the piston temperature based on a maximum limit temperature in which the piston temperature is set in advance and the control start temperature which is the value lower than the maximum limit temperature and set in advance or calculated every moment; and
outputting a count signal from a count output system when the number of times of the piston temperature suppression control is counted, if a ratio of a temperature difference which is the difference between the maximum limit temperature and the piston temperature to a margin width which is the difference between the maximum limit temperature and the control start temperature is equal to or less than a count threshold ratio set in advance or calculated.

* * * * *